United States Patent
Pendleton

Patent Number: 5,165,610
Date of Patent: Nov. 24, 1992

[54] GLASS DISPOSAL SYSTEM

[76] Inventor: William G. Pendleton, N5560 Coffee Rd., Helenville, Wis. 53137

[21] Appl. No.: 822,027

[22] Filed: Jan. 15, 1992

[51] Int. Cl.⁵ .............................................. B02C 19/14
[52] U.S. Cl. ........................................ 241/79; 241/99; 241/100
[58] Field of Search ............................ 141/99, 100, 79

[56] References Cited

U.S. PATENT DOCUMENTS

| | | | |
|---|---|---|---|
| 265,819 | 10/1882 | Johnston | 241/100 |
| 2,800,159 | 7/1957 | Walsh et al. | 241/99 |
| 3,151,814 | 10/1964 | Morgan et al. | 241/99 |
| 3,814,332 | 6/1974 | Nakao | 241/38 |
| 3,889,886 | 6/1975 | Spivey | 241/100 |
| 3,938,745 | 2/1976 | Gladwin | 241/99 |
| 3,987,972 | 10/1976 | Gladwin | 241/99 |
| 4,373,435 | 2/1983 | Grevich | 100/49 |
| 4,573,641 | 3/1986 | DeWoolfson et al. | 241/36 |
| 5,106,026 | 4/1992 | Baron | 241/99 |

FOREIGN PATENT DOCUMENTS

| | | | |
|---|---|---|---|
| 2745378 | 4/1979 | Fed. Rep. of Germany | 241/99 |
| 256487 | 3/1970 | U.S.S.R. | 241/99 |

Primary Examiner—Mark Rosenbaum
Assistant Examiner—John M. Husar
Attorney, Agent, or Firm—Quarles & Brady

[57] ABSTRACT

A disposal apparatus for breaking and shattering glass containers wherein a housing includes a device for shattering the glass, and there are at least two different receptacles for receiving the shattered glass positioned below the housing. The housing is located in different positions over the containers so as to deposit the shattered glass in one of the containers in one instance, and in another container in another instance. In the preferred embodiment, there is a platform for the housing and a support post connected to the platform. The support post is raised and rotated by a foot level so as to allow easy orientation of the housing with respect to the containers.

14 Claims, 2 Drawing Sheets

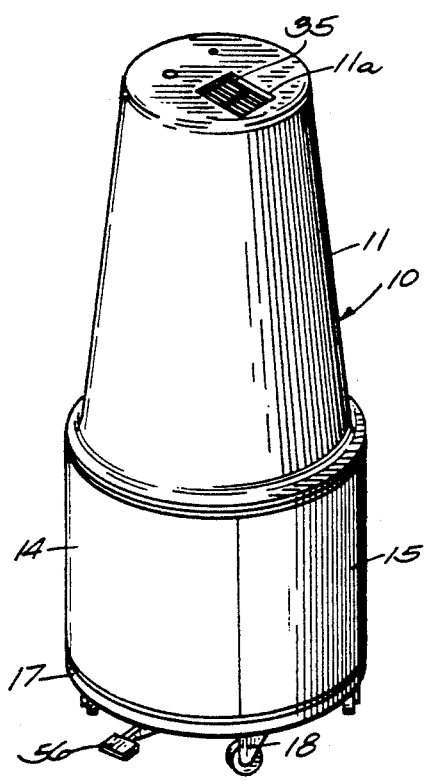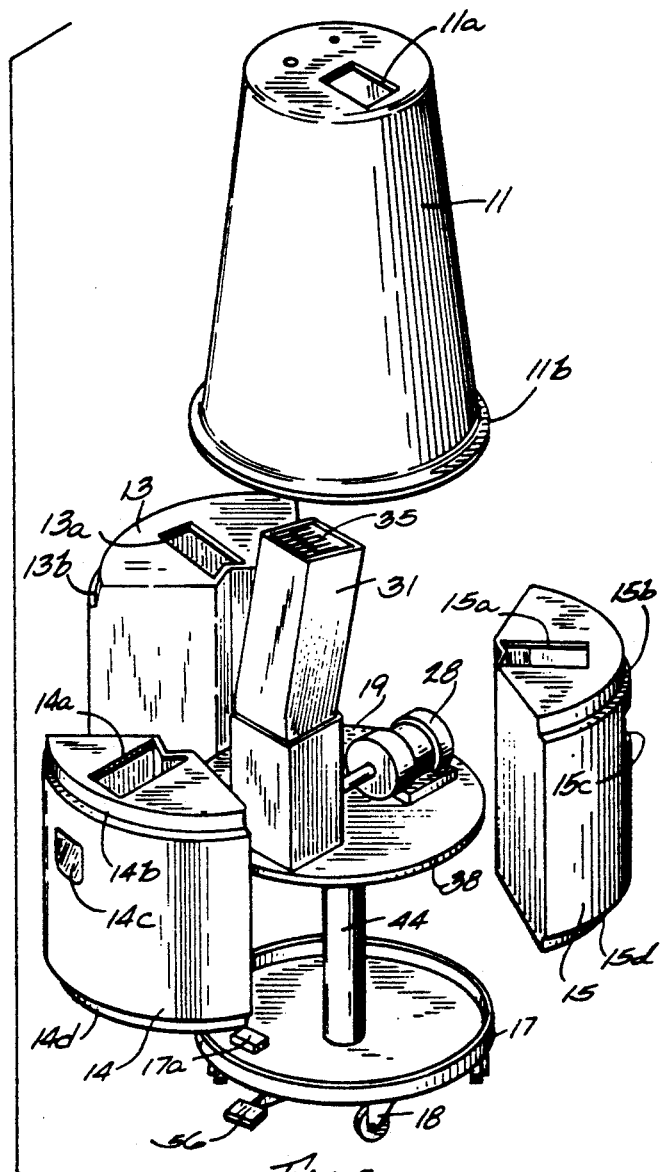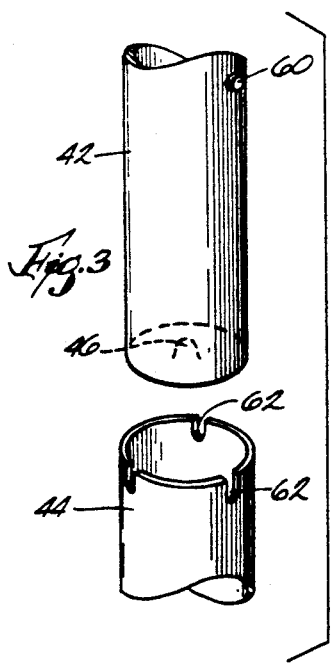

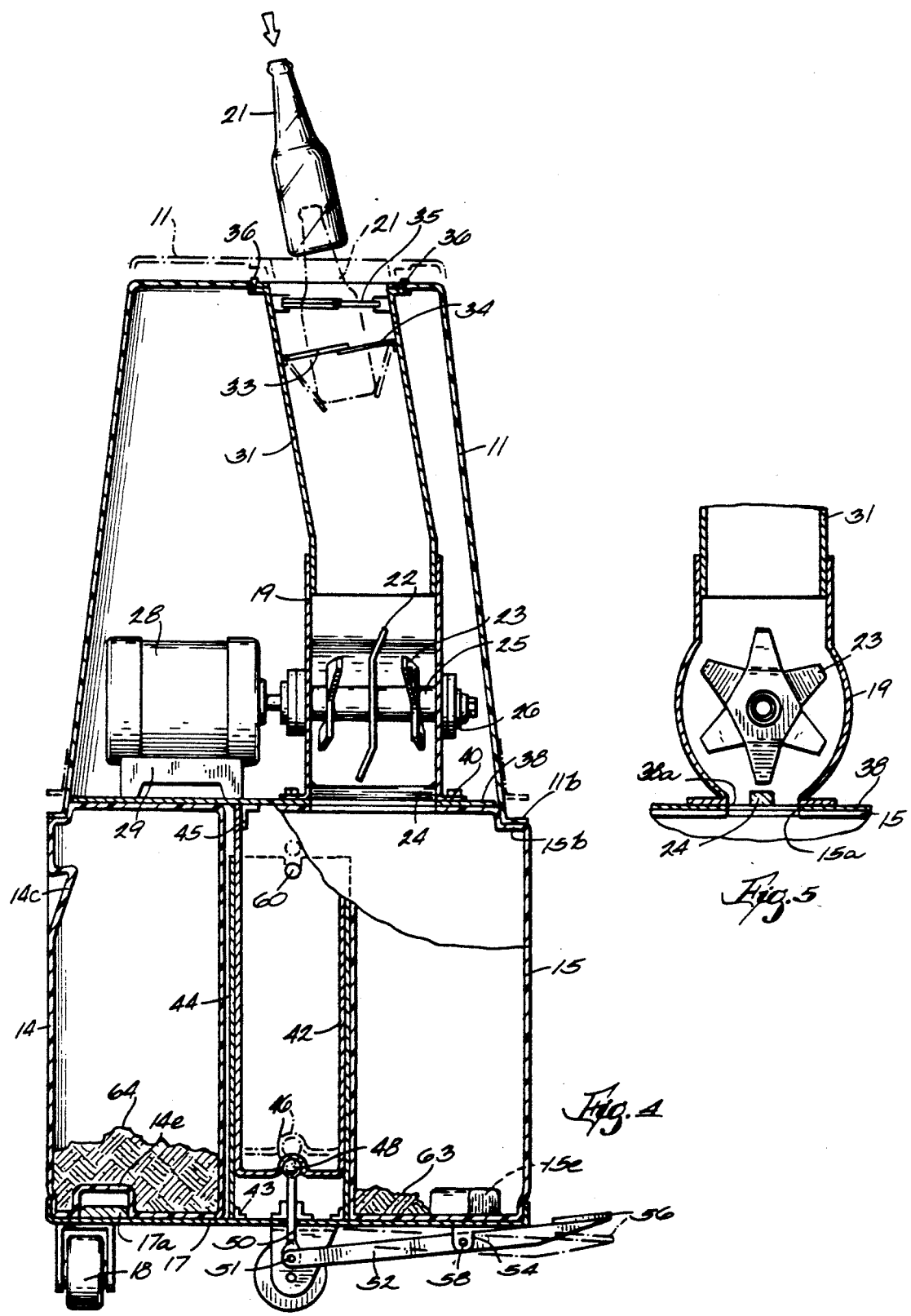

GLASS DISPOSAL SYSTEM

BACKGROUND OF THE INVENTION

This invention relates to a disposal system for glass containers such as bottles. More particularly, this invention relates to a glass compacting system which pulverizes bottles and provides a sorting mechanism to separate different colored glass from the containers into at least three separate sorting receptacles.

It is known in the prior art to utilize a crusher and separator for cans and bottles wherein three containers can receive crushed aluminum cans, steel cans or crushed glass. This is described in U.S. Pat. No. 4,373,435. In this patent, there is shown a gate (40) which is employed in conjunction with a drum (42) to separate glass as well as the cans and deposit them in their respective containers. A chute (36) is utilized in conjunction with the gate (40) for depositing the respective crushed articles in their respective containers.

In U.S. Pat. No. 2,800,159 there is shown a can and bottle crushing and disposal machine wherein cans and glass are deposited in receptables (78) and (82) by means of a butterly valve plate (84). In German patent 27 45 378 there is disclosed two rotatable receptacles (3) and (17) for apparently receiving some type of crushed or shredded material. In U.S. Pat. No. 4,573,641 there is illustrated a two receptacle container system (50) for receiving crushed glass. However, there is no detail as to how they are employed in conjunction with the crushing area (39) and the crushing wheels (40).

In utilizing crushing and separator type devices such as the type previously described, there is a problem in conjunction with glass containers in that there is a variety of colors of glass which need to be separated. These usually are clear, green and brown. It would be highly desirable if there would be provided a glass crushing apparatus which cannot only crush the glass containers in a compacting like manner, but can also readily separate them into individual bins or receptacles according to their color. The prior art does not provide such a crushing and compacting mechanism which can effect the sorting of the different colors of crushed glass in an apparatus which is constructed with a minimum number of parts and in a compact manner.

It is an advantage of the present invention to provide an improved glass crushing and separating device.

It is another advantage of the present invention to provide a device of the foregoing type which has a minimum number of parts in its construction, yet compact in its design.

It is still another advantage of the present invention to provide a device of the foregoing type which has a high degree of reliability and a minimum amount of maintenance.

Still another advantage of the present invention is to provide a device of the foregoing type which has an exterior configuration that is aesthetically pleasing and is portable.

SUMMARY OF THE INVENTION

The foregoing advantages are accomplished, and the shortcomings of the prior art are overcome by the present disposal apparatus for breaking and shattering glass containers or other glass articles of different colors. A housing has glass shattering means with the housing having an input portion for the glass containers or other glass articles and an out portion for shattered glass. There are at least two different receptacles for receiving the shattered glass with the receptacles adapted to be positioned below the housing with the glass shattered means for depositing shattered glass therein. There is also provided a locating means to alternatively position the housing over one of the receptacles in one instance and another of the receptacles in another instance.

In a preferred manner, the locating means is defined by a support platform for the housing, and there is a support post connected to the platform with means to raise the support post and rotate the support platform.

Also in a preferred manner, there are means to raise and pivot the platform which includes a foot operated lever pivotally connected to a base support member supporting the receptacles.

In another aspect of the invention, the support post includes indexing means for positively positioning the housing over one of the receptacles.

Also in another aspect, the glass shattering means is defined by a motor driven shaft having striking blades and a striking block.

BRIEF DESCRIPTION OF THE DRAWINGS

A better understandin9 of the disposal apparatus of this invention will be accomplished by reference to the drawings wherein:

FIG. 1 is a perspective view of the disposal apparatus of the present invention.

FIG. 2 is an assembly view of the apparatus shown in FIG. 1.

FIG. 3 is an enlarged partial view showing an indexing means with the disposal apparatus.

FIG. 4 is an enlarged view in vertical section of the disposal apparatus as shown in FIGS. 1 and 2.

FIG. 5 is a partial view in vertical section illustrating the striking blades and striking block which compose a glass shattering means for the disposal apparatus.

DESCRIPTION OF THE PREFERRED EMBODIMENT

Proceeding to a detailed description of the preferred embodiment of the present invention, and referring particularly to FIGS. 1 and 2, there is shown the disposal apparatus, generally 10, having a cover 11 and containers or receptacles 13, 14 and 15 supported on a base support 17 having casters 18.

As shown in FIG. 4, there is a housing 19 with a chute 31 for receiving glass bottles to be crushed such as 21. The housing 19 has enclosed therein the striking blades 22 and 23 and a striking block 24 with the latter being specifically shown in FIG. 5. The striking blades 22 and 23 are mounted on the shaft 25 journaled in the bearings 26. The shaft 25 is driven by the motor 28 which is mounted on the support 29. Both the motor 28 and the housing 19 are supported on the support platform 38. The housing 19 is secured to the platform 38 by the bolts 40. There is provided in the chute 31 spring loaded doors 33 and 34, as well as brushes 35. These reduce the possibility of crushed glass pieces from being ejected from the chute 31. Chute 31 is mounted in the cover 11 by the mounting screws 36.

An outer support post 44 is connected to the base support 17 such as by the annular collar 43. Telescopingly received in the outer support post 44 is an inner support post 42 which is connected to the platform 38 by the collar 45. A pocket 46 is provided in the inner support post 42 and receives a ball 48 provided at the end of the rod 50. Rod 50 is pivotally connected to the lever 52 by the pivot pin 51 with the lever 52 pivotally supported by the bracket 54 and the pivot pin 58. A foot portion 56 is provided at the end of the lever 52 opposite the rod 50.

Referring specifically to FIG. 3, it is seen that an indexing pin 60 extends from the inner support post 42 for selectively positioning in the indexing slots 62 of the outer support post 44. This provides an indexing means in conjunction with the chute 31 as will be more fully described in conjunction with the following Operation. Before turning to the Operation and referring back to FIG. 2, it is seen that the three containers 13, 14 and 15 all have top openings such as 13a, 14a and 15a for receiving crushed glass from the housing 19. Each of the containers also have side handle portions such as indicated at 14c and 15c for containers 14 and 15. A circumferential groove portion indicated at 13b, 14b and 15b receives a flanged portion 11b of the cover 11. This is best illustrated in FIG. 4. There is also a lower circumferential grooved portion such as 14d and 15d for seating inside the base support 11. Further, compartments such as 14e and 15e (See FIG. 4) are provided in the bottom of the containers 14 and tioned over the block portion 17a in the base support 17.

Operation

A better understanding of the advantages of the disposal apparatus 10 will be had by description of its operation. As illustrated in FIG. 4, glass bottles such as represented at 21 are placed in chute 31 where they will engage the striking blades 22 and 23 as well as the striking block 24. The striking blades 22 and 23 are driven by the motor 28 and the shaft 25. This action of the striking blades breaks the glass bottle into small pieces which then will drop downwardly from the housing 19 and through an opening 38a in platform 38. Depending upon the color of the bottle, the housing or chute 19 is orientated over one of the three containers 13, 14 or 15. In the instance of FIG. 4, the chute 19 is positioned over the container 15 so as to deposit the crushed glass 63 therein through the opening 15a. Assuming that the bottles 21 were of a different color, for example, green or brown, and it is desired to separate them into different containers, this is effected by positioning the chute 19 over one of the other containers such as 13 or 14. To do this, the foot portion 56 is depressed which then raises the rod 50 to raise the inner support post 42. This in turn raises the platform 38 and consequently the housing 19. It will be seen that the inner support post 42 with the pocket 46 is easily rotated over the ball 48, and this rotation is continued until the housing 19 is placed over container 13 or 14. Different colored crushed glass 64 is shown in container 14. The positioning of the housing 19 over the container 13, 14 or 15 is coordinated with the indexing pin 60 for seating in the indexing slot 62. The containers 13, 14 and 15 are orientated with respect to the base support 17 by the projection 17a for seating in the compartment 14e. With one of the containers such as 14 so or:entated, the other containers will likewise be automatically orientated with their openings 13a, 14a and 15a spaced 120° apart. This is accordingly synchronized with the spacing of the indexing slot 62. When the containers 13, 14 or 15 have a determined amount of crushed glass placed therein, they are easily removable by means of the handle portions such as 14c and 15c. The containers are easily removable from and held between the platform 38 and the base support 17 by the circumferential indentations 13b, 14b and 15b at the top and similar indentations such as 14d and 15d at the bottom.

It will thus be seen that there is provided a compact and easily oriented disposal apparatus wherein different colored glasses can be easily separated. The orientation of the glass crushing function with the containers 13, 14 and 15 is easily effected. All that is required to orientate the chute 31 or the housing 19 is a depression of a foot portion 56. This raises the platform 38 as well as the motor 28, the chute 31 and the housing 19 above the containers 13, 14 and 15 so that the platform 38 is easily rotated to the desired position. Rotation is easily effected as the weight of the platform 38 and the motor 28, the chute and housing 19 are supported on ball 48 which acts as a bearing. By its design, the unit is also aesthetically pleasing in having a conical top and a rounded bottom.

In the preferred embodiment there are shown three containers 13, 14 and 15, it is obvious that the number of these containers can vary and could be as few as two and as many as four. Neither is the positioning of the housing 19 near the outer portion of the platform 38 essential. This can be located in various postions depending upon the openings such as 13a, 14a and 15a in the respective containers. An indexing means as represented by the indexing pin 60 and the indexing slots 62 has been described. This could be eliminated if desired. Alternatively, an electrically operated indexing means could be substituted employing controls to activate solenoid valves for locating purposes and in conjunction with a motor and a suitable drive mechanism to rotate the platform 38 and the chute 19.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A disposal apparatus for breaking and shattering glass containers or other glass articles, of different colors comprising:

a housing including glass shattering means, said housing having an input portion for said glass containers or other glass articles and an output portion for shattered glass;

at least two separate receptacles for receiving said shattered glass, said receptacles adapted to be positioned below said housing with said glass shattering means for depositing shattered glass therein, said receptacles being positioned in a stationary manner with respect to said housing with said glass shattering means; and locating means to alternately position said housing over one of said receptacles in one instance and anotehr of said receptacles in anotehr instance.

2. The disposal apparatus of claim 1 wherein said locating means is defined by a support platform for said housing, a support post connected to said platform and means to raise and rotate said support post and rotate support platform.

3. The disposal apparatus of claim 2 wherein said means to raise and rotate said platform includes a foot operated lever pivotally connected to a base support member supporting said receptacles.

4. The disposal apparatus of claim 3 further including container retention means operatively associated with said base support and said receptacles.

5. The disposal apparatus of claim 2 wherein said support post includes indexing means for positively positioning said housing over one of said receptacles.

6. The disposal apparatus of claim 2 wherein there are three of said receptacles concentrically positioned around said support post and keyed in position on a base support.

7. The disposal apparatus of claim 2 wherein said housing is positioned on said support platform in an eccentric manner with respect to said support post.

8. The disposal apparatus of claim 1 wherein said glass shattering means is defined by a motor driven shaft having striking blades and a striking block.

9. The disposal apparatus of claim 1 wherein said input portion is defined by an angular chute member having means adjacent an inlet portion to retard shattered glass from leaving said chute.

10. The disposal apparatus of claim 1 further including a cover member enclosing said housing and having an opening for communication with said input portion of said housing.

11. A compact and portable disposal apparatus for breaking and shattering glass containers or other glass articles, or different colors comprising;
   a base support member having casters connected thereto;
   a multiplicity of receptacles supported on said support
   a centrally positioned sleeve member extending from said base support member, said receptacles positioned around said sleeve member in a nested manner;
   a housing including glass shattering means, said housing having an input portion for said glass containers or other glass articles and an output portion for shattered glass for selectively placing shattered glass in said receptacles;
   a support platform for said housing;
   a support post connected to said support platform, said support post telescopingly and rotatably positioned in said sleeve member;
   means operatively associated with said support post and said base support member to raise said support post; and
   a cover member enclosing said housing and having an opening for communication with said input portion of s id housing.

12. The disposal apparatus as defined in claim 11 wherein said glass shattering means is defined by a shaft having striking blades and a striking block, said shaft driven by a motor positioned on said support platform.

13. The disposal apparatus as defined in claim 11 wherein said containers are of a generally pie shaped configuration and said cover member is frusto-connical.

14. The disposal apparatus as defined in claim 11 wherein said receptacles are freely carried by said base support member.

* * * * *

UNITED STATES PATENT AND TRADEMARK OFFICE
CERTIFICATE OF CORRECTION

PATENT NO. : 5,165,610

DATED : November 24, 1992

INVENTOR(S) : William G. Pendleton

It is certified that error appears in the above-identified patent and that said Letters Patent is hereby corrected as shown below:

| | |
|---|---|
| Column 1, line 23 | after "in" "receptables" should be --receptacles--. |
| Column 1, line 24 | before "plate" "buterly valve" should be --butterfly valve--. |
| Column 2, line 26 | after "better" "understandin9" should be --understanding--. |
| Column 3, line 25 | after "14 and" --15 to provide a locating means for the containers posi- -- should be added. |
| Column 4, line 6 | after "easily" "oriented" should be --orientated--. |
| Claim 1 Column 4, line 59 | before "of" and before "instance" "anotehr" should be --another--. |
| Col. 6, Claim 11, line 2 | after "support" -- member-- should be inserted. |

UNITED STATES PATENT AND TRADEMARK OFFICE
CERTIFICATE OF CORRECTION

PATENT NO. : 5,165,610
DATED : November 24, 1992
INVENTOR(S) : William G. Pendleton Page 2 of 2

It is certified that error appears in the above-indentified patent and that said Letters Patent is hereby corrected as shown below:

Column 6, line 21    before "housing" "s id" should be --said--.

Signed and Sealed this

Twenty-sixth Day of October, 1993

Attest:

BRUCE LEHMAN

Attesting Officer

Commissioner of Patents and Trademarks